UNITED STATES PATENT OFFICE.

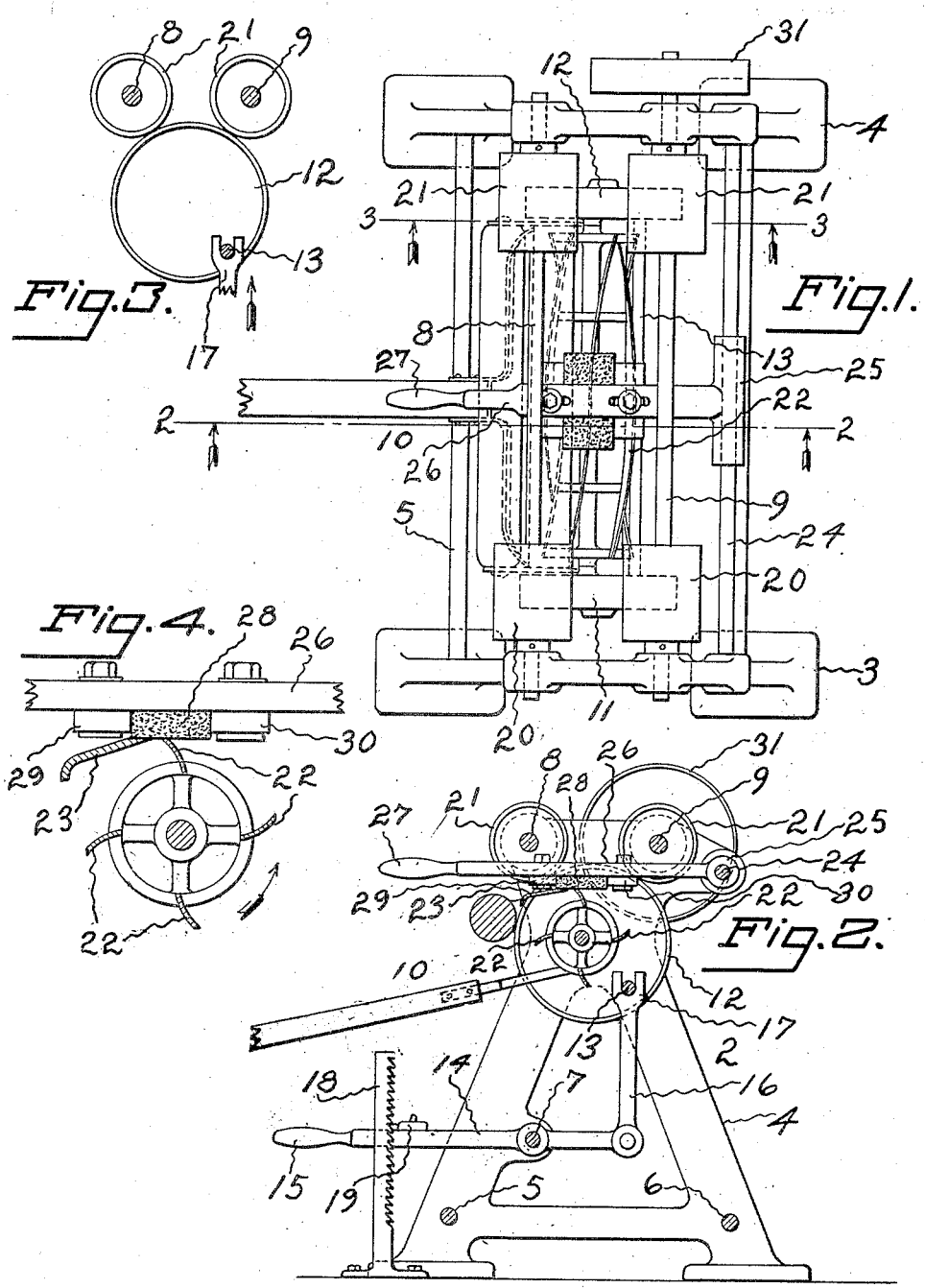

GEORGE W. FERNSIDE, OF HARTFORD, CONNECTICUT.

GRINDER FOR LAWN-MOWERS.

1,383,091.  Specification of Letters Patent.  Patented June 28, 1921.

Application filed March 21, 1919, Serial No. 284,107. Renewed November 23, 1920. Serial No. 426,104.

*To all whom it may concern:*

Be it known that I, GEORGE W. FERNSIDE, a citizen of the United States, residing at Hartford, in the county of Hartford and State of Connecticut, have invented certain new and useful Improvements in Grinders for Lawn-Mowers, of which the following is a specification.

This invention relates to grinders for lawn mowers. I desire to make it clear at this point that I use this title for convenience and also for the important fact that the article has been found of especial advantage for sharpening the blades or knives of lawn mowers. It is feasible that it may be utilized with equally good results in the sharpening of other things. I have several motives in view, the principal ones being the provision of an apparatus of the character set forth, by which the blades of a lawn mower or something of an equivalent character, can be sharpened or edged in a quick and efficient manner. The device is comparatively light, yet possesses the necessary strength. The lawn mower can be easily mounted and dismounted and can be ground thoroughly in a simple and easy manner and without taking the same apart.

The device possesses other features of novelty and advantage which with the foregoing, will be set forth at length in the following description wherein I will outline in detail that form of embodiment of the invention which I have selected for illustration in the drawings accompanying and forming part of the present specification. The novelty of the invention will be included in the claims succeeding said description. I may depart in several respects from the disclosure of said description, within the scope of the invention defined by said claims.

Referring to said drawings:—

Figure 1 is a top plan view of the machine.

Fig. 2 is a cross section on the line 2—2 of Fig. 1 looking in the direction of the arrows.

Fig. 3 is a practically similar section on the line 3—3 of Fig. 1, only a few of the parts however being shown.

Fig. 4 is a detail in cross sectional elevation and hereinafter more particularly described.

Like characters refer to like parts throughout the several views which it will be noted are on different scales.

The various parts of the structure may be carried by any suitable framing, that shown for the purpose being denoted in a general way by 2. As represented said framing comprises the practically duplicate standards 3 and 4 in effect A-form. These standards are as shown connected rigidly together by rods as 5, 6, 7, 8 and 9, and they are spaced apart a distance sufficient to receive between them a lawn-mower such as that denoted in a general way by 10. Primarily the rods 5 and 6 merely tie together the standards or uprights 3 and 4. The rods 7, 8 and 9, as I will later explain, in addition to tying said standards, also act as shafts.

The lawn-mower after the usual fashion comprises the ground wheels 11 and 12, which obviously rotate on the ground or grass. They are connected by a rod or strut as 13.

To support the lawn-mower during the grinding operation, any suitable means, such as that now to be described, may be provided. The rod 7, which is between the lower and upper ends of the duplicate standards 3 and 4, has loosely fitted to it between the ends thereof, a rock-lever 14 having a comparatively short inner branch and a long outer branch terminating in a handle 15. There is sustained by the short arm or branch of said lever 14, the bar 16, which can as shown, be conveniently pivoted to the lever, said bar having at its upper end a fork 17 to receive the tie-rod 13.

For maintaining the lawn-mower 10 in position to have a cutter or cutters or blades ground, the means shown, which I will now describe, may be utilized. Practically, midway between standards 3 and 4, there is shown as mounted a rack-bar 18 coöperative with a spring-governed detent 19 on the long arm of the lever 14, in adjacence to the rack-bar 18. In Fig. 2, in fact, the detent is shown as engaging against one of the squared faces of a tooth of the rack-bar 18 to uphold the lawn-mower 10 in position to have its blades ground. By freeing the detent 19 from the tooth which it engages, it becomes a simple matter to manipulate the lever 14 and correspondingly move the bar 16 and hence the lawn-mower. When the lawn-mower is in the desired position, it may be there held, as I have explained, by the detent engaging a squared face of a tooth of the rack-bar 18.

The rods 8 and 9 constitute supports for rolls as 20 and 21, said shafts 8 and 9 being, as will be clear, in parallelism with each other, spaced apart a desired distance and connected with the standards 3 and 4 near the upper ends thereof. Each of the shafts 8 and 9 carries two of the rollers 20 and 21, the rollers of the respective pairs being in practically transverse alinement with each other, as clearly shown in Fig. 1. In elevating the lawn-mower 10 in the manner previously described, through the manipulation of the hand-lever 14, the ground wheels of the lawn-mower strike against the pairs of rolls 20 and 21, as shown best in Fig. 2, and also in Fig. 1 for that matter. It should be noted at this point that these rolls are connected with the respective rods or shafts 8 and 9 so that a pair of rolls on the application of proper power can be utilized to rotate the ground wheels of the lawn-mower to bring different blades 22 of the revoluble series in position to be ground, the grinding-member being also adapted to grind the stationary blade 23 of the mower.

The standards 3 and 4 are shown as tied together at their rear upper ends by the rod or shaft 24, which loosely carries the hub 25 of the lever 26 furnished at its free end with a handle 27, which provides a simple way of operating said lever. This lever constitutes a convenient carrier for a grinding-member as 28 which may as shown consist of a piece or slab of carborundum or emery held between the adjustable clamping members 29 and 30 on the under side of the lever 26, as best shown in Fig. 4. The slab of grinding material 28 fits flatwise against the intermediate portion of the lever and is held securely in place by said clamping members. The lever 26 it will be clear may be freely rocked on the shaft or tie-rod 24 and in addition to this may be moved longitudinally of said tie-rod so that it can properly be brought in contact with each blade 22 longitudinally thereof. The grinding member 28 can also be utilized to sharpen the fixed blade 23 of the lawn-mower.

It is desirable that the blades be revolved during grinding and this particular action can be accomplished through the rotation of the rolls 20 and 21 on the shaft 9 to which said rolls are fastened as by pinning. One end of said shaft 9 as shown has fixed thereto a pulley 31 which may be rotated, for example, by a belt to rotate the shaft 9 and hence the rolls 20 and 21 and the consequent rotation of the ground wheels of the lawn-mower so that every part of the revoluble blades may be brought under the action of the grinding member.

The action of the machine is as follows: The lawn-mower 10 will be mounted in an inverted position in the manner previously set forth and its ground wheels will be placed between the two pairs of rolls 20 and 21. When this is done the lawn-mower is maintained solidly in position and the pulley or equivalent wheel 31 will then be turned by power. This results in the rapid rotation of the shaft 9 and the friction rolls 20 and 21 thereon, and the consequent rapid rotation of the ground wheels 11 and 12 of the lawn mower, the result being that the spider of the mower to which the blades 22 are connected is rotated. As the blades are rotated, the lever 26, then in its lowered position, as shown in Fig. 2 is moved laterally the requisite distance along the shaft 24 so as to bring the grinding member or carborundum, simultaneously or virtually so, against every edge portion of the rotary blades 22 and the stationary blade 23 of the lawn-mower.

What I claim is:

1. A machine for grinding the blades of a lawn-mower, comprising means for supporting the lawn-mower, means for causing the rotation of the blades of the lawn-mower, and movable means provided with a member rigid therewith for grinding the blades during the rotation thereof.

2. A machine for grinding the blades of a lawn-mower, comprising means for supporting a lawn-mower in inverted position and for pressing the same upwardly, means for causing the rotation of the blades of said lawn-mower when in said inverted position, and a lever provided with a grinding-member, the lever being positioned to cause the grinding member to act on said blades and being movable to cause the grinding member to grind said blades longitudinally thereof.

3. A machine for grinding the rotary and stationary blades of a lawn-mower, comprising means for supporting the lawn-mower, means for causing the rotation of the rotary blades of said lawn-mower, and a lever provided with a fixed grinding member, the lever being positioned to cause the grinding member to act on said blades and being movable to cause the grinding member to grind said blades longitudinally thereof.

4. A machine for grinding the blades of a lawn-mower, comprising means for supporting the lawn-mower, means for causing the rotation of said blades, and an oscillatory lever provided with a grinding-member to act on the blades, the lever being mounted for movement in the direction of its axis of oscillation to thus cause the grinding-member to act on the blades longitudinally thereof.

5. A machine for grinding the rotary and the stationary blades of a lawn-mower, comprising means for supporting the lawn-mower, means for causing the rotation of the rotary blades thereof, and an oscillatory lever provided with a grinding member to act simultaneously on rotary and stationary blades and mounted for movement in the direction of its axis of oscillation.

6. A machine for grinding the blades of a lawn-mower, comprising rolls arranged in pairs, the rolls of the respective pairs being adapted to receive between them the ground-wheels of the lawn-mower, means for pressing the ground wheels upwardly against the rolls, means for rotating at least one of the rolls and thus the rotation of the ground-wheels, and means for grinding the blades of the lawn-mower during the rotation of said ground-wheels.

7. A machine for grinding the stationary and the rotary blades of a lawn-mower, comprising means for supporting the lawn-mower, means for rotating the ground-wheels of the lawn-mower, a flat grinding member, and means for causing the flat grinding member to simultaneously grind the blades of the lawn mower during said rotation.

8. A machine for grinding the blades of a lawn-mower, comprising means for supporting the lawn-mower, rolls engaging the ground-wheels of the lawn-mower, means for causing the rotation of rolls and thus the ground wheels, a flat grinding member, and means for causing the grinding member to simultaneously grind the rotary and the fixed blades of the lawn-mower during said rotation.

9. A machine for grinding the blades of a lawn-mower, comprising means for supporting the lawn-mower, friction rolls engaging the ground-wheels of the lawn-mower, means for causing the rotation of friction rolls and thus the ground-wheels, means for forcing the lawn-mower upwardly to cause the ground wheels to engage the friction rolls and for positively holding the lawn-mower in said relation during the rotation of the ground wheels and means for grinding the blades of the lawn mower during said rotation.

10. A machine for grinding the blades of a lawn-mower, comprising a lever, a forked bar jointed to one arm of the lever, the fork of which is adapted to receive a part of the lawn-mower to thus sustain the same, a fixed rack, the other arm of the lever being provided with a detent to engage the rack, means for rotating the ground wheels of the lawn-mower, and means for grinding the blades of the lawn-mower during the rotation of said ground wheels.

In testimony whereof I affix my signature in the presence of two witnesses.

GEORGE W. FERNSIDE.

Witnesses:
   Margaret T. Dennis,
   Heath Sutherland.